United States Patent Office 3,557,089
Patented Jan. 19, 1971

3,557,089
PREPARATION OF 1-(CARBAMOYL)-N-(CAR-BAMOYLOXY)THIOFORMIMIDATES FROM ACETOACETAMIDES
Edward W. Raleigh, Wilmington, Del., assignor to E. I. du Pont de Nemours and Company, Wilmington, Del., a corporation of Delaware
No Drawing. Filed Dec. 27, 1968, Ser. No. 787,614
Int. Cl. C07d 29/34
U.S. Cl. 260—239                                        16 Claims

ABSTRACT OF THE DISCLOSURE

1 - (carbamoyl) - N-(carbamoyloxy)thioformimidates such as methyl 1-(carbamoyl)-N-(methylcarbamoyloxy)-thioformimidate and methyl 1-(dimethylcarbamoyl)-N-(methylcarbamoyloxy)thioformimidate are prepared by the steps of (a) reacting diketene with ammonia or an amine to obtain an acetoacetamide;
(b) chlorinating the product of (a) at a temperature of −10 to 70° C.;
(c) reacting the product of (b) with a nitrosating agent in the presence of methanol, ethanol, isopropanol, water or their mixtures;
(d) reacting the product of (c) with a mercaptan and then adding a base; and
(e) reacting the product of (d) with either
   (1) a carbamoyl chloride in the presence of a base; or
   (2) an isocyanate, optionally in the presence of a basic catalyst; in water or organic solvents such as acetone and methylene chloride.

BACKGROUND OF THE INVENTION

This invention relates to methods for preparing 1-(carbamoyl)-N-(carbamoyloxy)thioformimidates. More particularly this invention is directed to methods of preparing the thioformimidates by reacting diketene with ammonia or an amine, chlorinating the product of that reaction, then reacting the product with a nitrosating agent, reacting the resultant hydroxamoyl chloride with a mercaptan in the presence of a base, and then preparing the desired thioformimidate by reaction either with a suitable carbamoyl chloride in the presence of a base, or isocyanate optionally in the presence of a basic catalyst.

The product thioformimidates are useful as pesticides and can be prepared in the manner disclosed in copending application Ser. No. 728,739, filed May 13, 1968. They can also be prepared from glyoxylic acid in the manner disclosed and claimed in copending application Ser. No. 772,811, filed Nov. 1, 1968.

By the methods of this invention it is possible to prepare the thioformimidates of Formula 1 below in a five-step process in which the first two steps can be operatively combined. By thus avoiding the necessity to separate and recover the intermediate compound the methods of this invention permit economic preparation of the compounds of Formula 1 below in very good yield.

SUMMARY

In summary, this invention is directed to the preparation of 1 - (carbamoyl) - N-(carbamoyloxy)thioformimidates of the following formula (1) 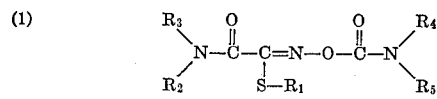

wherein
R₁ is alkyl of 1 through 4 carbon atoms or alkenyl of 3 through 4 carbon atoms;
R₂ is hydrogen, alkyl of 1 through 4 carbon atoms, methoxy, or cycloalkyl of 3 through 5 carbon atoms;
R₃ is hydrogen or alkyl of 1 through 4 carbon atoms; with the proviso that R₂ and R₃ can be joined and are alkylene of 2 through 6 carbon atoms, and with the limitation that R₂ and R₃ never total more than 7 carbon atoms;
R₄ is alkyl of 1 through 3 carbon atoms, allyl or propargyl; and
R₅ is hydrogen or methyl;

by the steps comprising:
(a) reacting diketene with ammonia or an amine in the presence of water or an inert organic solvent;
(b) chlorinating the product of (a) at a temperature of −10 to 70° C.;
(c) reacting the product of (b) with a nitrosating agent in the presence of methanol, ethanol, isopropanol, water, or their mixtures;
(d) reacting the product of (c) with a mercaptan, then adding base to the reaction mixture; and
(e) reacting the product of (d) with either (1) a carbamoyl chloride in the presence of a base; or (2) an isocyanate in the presence or absence of a basic catalyst; in water, acetone, methylene chloride, methyl ethyl ketone, or methyl isobutyl ketone.

The compounds of Formula 1 and their use as pesticides are described and exemplified in application Ser. No. 728,739, referred to above.

DESCRIPTION OF THE INVENTION

The process of this invention used in preparing the compounds of Formula 1 comprises the five steps enumerated above, and more fully described as follows:

Step (a)

The reaction of diketene with ammonia or an amine in the presence of water or an inert organic solvent (a) 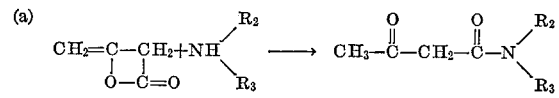

in which R₂ and R₃ are as defined in Formula 1 above.

Equimolecular quantities of diketene and ammonia or an amine are gradually mixed in a solvent such as diethyl ether, benzene, methylene chloride, or water, with water the preferred solvent. The diketene can be added to a solution of ammonia or amine, or the ammonia or amine can be added to a solution of diketene, or both reactants can be added simultaneously to the solvent. It is preferred to add the diketene to an aqueous solution of ammonia or amine.

The reaction is carried out at a temperature between about −20° C. and 80° C., depending on the solvent used. If water is used as solvent a reaction temperature of between about 0° C. and 50° C. is preferred. The time of addition is not critical and depends upon the cooling capacity of the reaction equipment. For economy and convenience it is preferred to keep addition time to a minimum. Addition times of 30 to 60 minutes are ordinarily adequate. Completion of the reaction can be observed when a stable pH of 6–8 is obtained.

At the conclusion of the reaction the product can be isolated by conventional techniques such as by evaporation of the solvent or extraction with an organic solvent, and can be purified by distillation. However, it is ordinarily preferred to run the step (a) reaction in water, and to use the product in the step (b) chlorination without isolation of the step (a) product.

Step (b)

Step (b) comprises reaction of chlorine with the acetoacetamide in the presence or absence of a solvent and is illustrated by the equation (b) 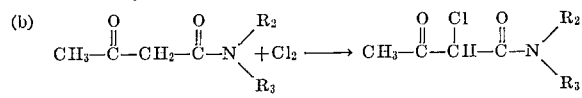

wherein $R_2$ and $R_3$ are as defined above.

If the intermediate product of step (a) has been isolated or purified, it is preferred to mix the product with water, cool the mixture and add chlorine. If the step (a) product has not been isolated from the reaction medium of step (a) the product mixture is cooled and chlorinated as is. Suitable solvents include water, methanol, ethanol, isopropanol and their mixtures.

The chlorination should be carried out at a temperature between about $-10°$ C. and $70°$ C. and preferably between about $20°$ C. and $50°$ C. except when an alcohol solvent is used at which times temperatures below $0°$ C. are preferred. The amount of chlorine used will vary from stoichiometric to 5% molar excess but it is preferred to use stoichiometric amounts.

The chlorine is ordinarily added over a period of 30 to 60 minutes although it can be added more rapidly if desired. After addition is complete the mixture is stirred, usually for about 30 to 60 minutes, usually at a temperature of about 20 to 50° C. The reaction is complete when the color of the reaction mixture disappears.

Elemental chlorine is the preferred source of chlorine when water is the solvent, however other chlorinating agents, such as sodium, lithium and potassium hypochlorite can be used if desired, and sulfuryl chloride may be preferred when no solvent is used.

For economic reasons water is the preferred solvent and obviously when step (a) product is used without isolating the product from the solvent, step (b) is carried out in the solvent of step (a). When alcoholic solvents are used it is sometimes advantageous to operate using a heel process.

The reaction product of step (b) can be isolated, if desired, or it can be used directly without isolation in the reaction of step (c).

Step (c)

Step (c) comprises formation of the hydroxamoyl chloride and is illustrated by the equation (c) 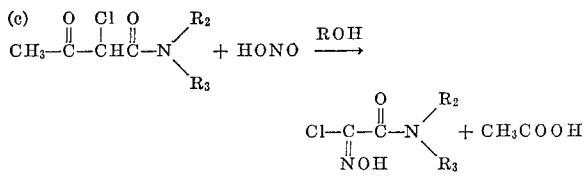

wherein R is methyl, ethyl hydrogen, or isopropyl, and $R_2$ and $R_3$ are as defined above.

The product of step (b) and solvent, if not already present from step (b), are charged initially to a reaction vessel. The nitrosating agent is then added to the reaction mixture at such a rate that the temperature remains between $-20°$ C. and $50°$ C. and the pH remains above 4.0. Preferably the nitrosation is carried out at a temperature between about $0°$ C. and $10°$ C. and above a pH of 4.5.

As indicated above, suitable solvents include methanol, ethanol, isopropanol, water, and their mixtures. The concentration of the product of step (b) in the solvent will ordinarily range between about 20 and 50% by weight.

Suitable nitrosating agents include the lower alkyl nitrites and nitrite salts such as sodium, potassium, and calcium salts in conjunction with a liberating acid such as hydrochloric. The nitrosating agent is used in approximately stoichiometric amounts based on the product of step (b).

The product of step (c) can be isolated if desired or it can be used directly in the reaction of step (d) without isolation. It is sometimes preferred to isolate the product of step (c) thus removing excess acid, prior to step (d), to cut down consumption of base in step (d).

Step (d)

The hydroxamoyl chloride from step (c) is reacted with a mercaptan and a base in a solvent according to the equation (d) 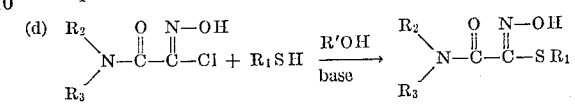

wherein $R_1$ is as defined above, and $R'$ is hydrogen, methyl, ethyl or propyl.

This reaction is carried out in the presence of water, methanol, ethanol, isopropanol or their mixtures, at a temperature between $-10$ and $70°$ C., preferably between 0 and $40°$ C., according to one of the following alternate procedures: (1) The hydroxamoyl chloride, if isolated after step (c), is dissolved in a solvent along with a slight excess of mercaptan. An aqueous solution of base is then added to accept the HCl liberated during the reaction. This procedure is preferably carried out in methanol as a solvent. The product can be isolated by removing the solvent, preferably under reduced pressure, followed by filtration. (2) The hydroxamoyl chloride in the reaction medium of step (c) is treated with a preprepared solution of a metal salt of a mercaptan or with the mercaptan itself, followed by addition of the aqueous base. More base is required for this procedure than in (1) above because of the additional acetic acid and hydrochloric acid which are present in the reaction mixture of step (c). The product can be isolated by simple filtration if desired.

Bases which are suitable acid acceptors for adjusting the pH are the hydroxides, carbonates and bicarbonates of sodium, potassium, calcium and magnesium. The final pH should be between 5 and 9 and a pH of about 7 is preferred.

As stated, the product can be isolated if desired, or alternatively if water is the solvent, the product mixture can be used as is in step (e). It is usually preferred to isolate the product prior to use in step (e).

Step (e)

Conversion of the product of step (d) to the desired formimidate is carried out by reacting the product of step (d) with an isocyanate or carbamoyl chloride according to the equation (e₁) 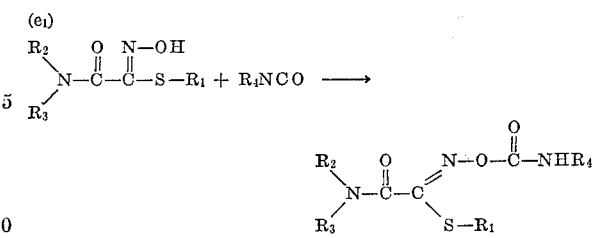

or (e₂) 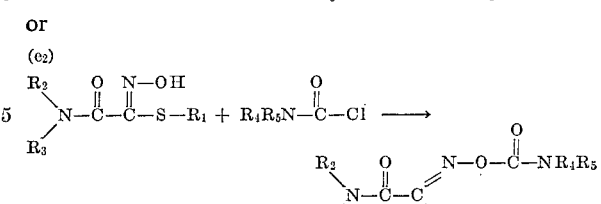

wherein $R_1$, $R_2$, $R_3$, $R_4$, and $R_5$ are as defined above. The reactions of step (e) are carried out in a solvent such as water, acetone, methyl ethyl ketone, methyl isobutyl ketone, or methylene chloride, at a temperature which can range from below $-10°$ C. to the boiling point of the solvent. Anhydrous solvents are preferred to avoid possible side-reactions of isocyanate or carbamoyl chloride with water. The reaction of step ($e_1$) is facilitated by the presence of a basic catalyst such as trimethylamine or triethylenediamine. The reaction of step ($e_2$) is carried out in the presence of an equimolar quantity of a base such as triethylamine, trimethylamine or the hydroxides, carbonates or bicarbonates of sodium, potassium, calcium or magnesium. Alternatively, the sodium salt of the product of step (d) can be formed by reaction with a metal hydride such as sodium hydride. The resulting sodium salt can then be reacted with a carbamoyl chloride in an inert solvent such as tetrahydrofuran to obtain products as obtained in the ($e_2$) reaction.

The 1-(carbamoyl)-N-(carbamoyloxy)thioformimidate products of step (e) can be isolated by conventional procedures such as filtration or extraction.

Of the steps (a) through (e) the more important are steps (b) and (c) which provide an advantageous method of preparing the hydroxamyl chloride intermediate. A preferred sequence of reaction is to chlorinate and nitrosate in step (b) and (c) reactions, a previously obtained acetoacetamide prepared by any suitable process step (a), and follow the nitrosation with the steps (d) and (e).

The process of this invention is further illustrated in the following examples wherein parts and percentages are by weight unless otherwise noted.

EXAMPLE I

To 86 parts of a 25% aqueous solution of dimethylamine is added 200 parts of water, followed by the addition of enough diketene at 20 to 30° C. to give a stable pH of 7; 41.3 parts of diketene are required. The resulting N,N-dimethyl acetoacetamide is isolated by extraction with methylene chloride followed by evaporation of the solvent. To 129 parts of N,N-dimethyl acetoacetamide so obtained is added 141.7 parts of sulfuryl chloride over about one hour at 30 to 35° C. After addition is complete the reaction mixture is held at 50° C. for 30 minutes, and then briefly sparged with nitrogen.

To the resulting N,N-dimethyl 2-chloroacetoacetamide is added 394 parts of ethanol. In a separate vessel 200 parts of 36% hydrochloric acid is added to 145 parts of sodium nitrite and 104 parts of ethanol in 100 parts of water. The ethyl nitrite evolved is collected in a chilled trap and 75 parts of the ethyl nitrite are subsequently added to the ethanolic solution of N,N-dimethyl 2-chloroacetoacetamide in about one hour at 5° C. The reaction mixture is stirred at 5° C. for a further 4 hours and is then allowed to warm slowly to ambient temperature.

The reaction mixture, which contains dimethylcarbamoylformhydroxamoyl chloride, is then cooled to −10° C. and 60 parts of methyl mercaptan are added followed by the gradual addition of about 160 parts of 50% aqueous sodium hydroxide solution at −10° to −5° C., so that a stable pH of 7 is obtained. The resulting methyl 1-(dimethylcarbamoyl) - N - hydroxythioformimidate is isolated by filtration, washed with water, and dried.

To a suspension of 70 parts of methyl 1-(dimethylcarbamoyl)-N-hydroxythioformimidate and ½ part of triethylenediamine in 350 parts of acetone at 40° C. is added slowly 27 parts of methyl isocyanate. The temperature of the reaction mass rises to 58° C. After the temperature of the reaction mass has subsided to 25° C., the solvent is evaporated under reduced pressure, and the resulting residue recrystallized. Recrystallization from benzene gives one isomer of methyl 1-dimethylcarbamoyl-N-(methylcarbamoyloxy)thioformimidate, melting point 109-110° C. Recrystallization from water gives the other isomer of methyl 1-(dimethylcarbamoyl)-N-(methlycarbamoyloxy)thioformimidate, melting point 101–103° C.

The compounds of Table I are prepared by the procedures of Example 1, using the mercaptans, amines and isocyanates listed in place of the methyl mercaptan, dimethylamine and methyl isocyanate of Example I.

TABLE I

| Mercaptan | Amine | Isocyanate | Product |
| --- | --- | --- | --- |
| Ethyl mercaptan | Dimethylamine | Methyl isocyanate | Ethyl 1-(dimethylcarbamoyl)-N-(methylcarbamoyloxy)thioformimidate. |
| Allyl mercaptan | do | do | Allyl 1-(dimethylcarbamoyl)-N-(methylcarbamoyloxy)thioformimidate. |
| But-2-enyl mercaptan | do | Ethyl isocyanate | But-2-enyl 1-(dimethylcarbamoyl)-N-(ethylcarbamoyloxy)thioformimidate. |
| Isopropyl mercaptan | do | Allyl isocyanate | Isopropyl 1-(dimethylcarbamoyl)-N-(allylcarbamoyloxy)thioformimidate. |
| Methyl mercaptan | do | Propargyl isocyanate | Methyl 1-(dimethylcarbamoyl)-N-(propargylcarbamoyloxy)thioformimidate. |
| Propyl mercaptan | do | Methyl isocyanate | Propyl 1-(dimethylcarbamoyl)-N-(methylcarbamoyloxy)thioformimidate. |
| Allyl mercaptan | do | Allyl isocyanate | Allyl 1-(dimethylcarbamoyl)-N-(allylcarbamoyloxy)thioformimidate. |
| Isopropyl mercaptan | do | Methyl isocyanate | Isopropyl 1-(dimethylcarbamoyl)-N-(methylcarbamoyloxy)thioformimidate. |
| Butyl mercaptan | do | do | Butyl 1-(dimethylcarbamoyl)-N-(methylcarbamoyloxy)thioformimidate. |
| sec-Butyl mercaptan | do | do | sec-Butyl 1-(dimethylcarbamoyl)-N-(methylcarbamoyloxy)thioformimidate. |
| tert-Butyl mercaptan | do | do | tert-Butyl 1-(dimethylcarbamoyl)-N-(methylcarbamoyloxy)thioformimidate. |
| Methyl mercaptan | do | Ethyl isocyanate | Methyl 1-(dimethylcarbamoyl)-N-(ethylcarbamoyloxy)thioformimidate. |
| Butyl mercaptan | do | do | Butyl 1-(dimethylcarbamoyl)-N-(ethylcarbamoyloxy)thioformimidate. |
| Methyl mercaptan | do | Isopropyl isocyanate | Methyl 1-(dimethylcarbamoyl)-N-(isopropylcarbamoyloxy)thioformimidate. |
| Butyl mercaptan | do | do | Butyl 1-(dimethylcarbamoyl)-N-(isopropylcarbamoyloxy)thioformimidate. |
| Allyl mercaptan | do | Propyl isocyanate | Allyl 1-(dimethylcarbamoyl)-N-(propylcarbamoyloxy)thioformimidate. |
| Methyl mercaptan | do | Allyl isocyanate | Methyl 1-(dimethylcarbamoyl)-N-(allylcarbamoyloxy)thioformimidate. |
| Butyl mercaptan | do | do | Butyl 1-(dimethylcarbamoyl)-N-(allylcarbamoyloxy)thioformimidate. |
| Allyl mercaptan | do | Propargyl isocyanate | Allyl 1-(dimethylcarbamoyl)-N-(propargylcarbamoyloxy)thioformimidate. |
| Methyl mercaptan | Methylamine | Methyl isocyanate | Methyl 1-(methylcarbamoyl)-N-(methylcarbamoyloxy)thioformimidate. |
| Do | Butylamine | do | Methyl- 1(butylcarbamoyl)-N-(methylcarbamoyloxy)thioformimidate. |
| Isopropyl mercaptan | Cyclopropylamine | do | Isopropyl 1-(cyclopropylcarbamoyl)-N-(methylcarbamoyloxy) thioformimidate. |
| Allyl mercaptan | N,O-dimethylhydroxylamine | Ethyl isocyanate | Allyl 1-(N-methoxy-N-methylcarbamoyl)-N-(ethylcarbamoyloxy) formimidate. |
| Ethyl mercaptan | Isopropylamine | Allyl isocyanate | Ethyl 1-(isopropylcarbamoyl)-N-(allylcarbamoyloxy)thioformimidate. |

TABLE I.—Continued

| Mercaptan | Amine | Isocyanate | Product |
|---|---|---|---|
| Methyl mercaptan | Ethylamine | Propargyl isocyanate | Methyl 1-(ethylcarbamoyl)-N-(propargylcarbamoyloxy)thioformimidate. |
| Do | Diethylamine | Methyl isocyanate | Methyl 1-(diethylcarbamoyl)-N-(methylcarbamoyloxy)thioformimidate. |
| Do | Diisopropylamine | do | Methyl 1-(diisopropylcarbamoyl)-N-(methylcarbamoyloxy)thioformimidate. |
| Do | Aziridine | do | Methyl 1-(aziridinocarbonyl)-N-(methylcarbamoyloxy)thioformimidate. |
| Do | Hexahydroazepine | do | Methyl 1-(hexahydroazepinocarbonyl)-N-(methylcarbamoyloxy)thioformimidate. |
| Do | Pyrrolidine | do | Methyl 1-(pyrrolidinocarbonyl)-N-(methylcarbamoyloxy)thioformimidate. |
| Do | Methylamine | Allyl isocyanate | Methyl 1-(methylcarbamoyl)-N-(allylcarbamoyloxy)thioformimidate |
| Do | N,O-dimethylhydroxylamine | Methyl isocyanate | Methyl 1-(N-methoxy-N-methylcarbamoyl)-N-(methylcarbamoyloxy)thioformimidate. |
| Do | N-methyl-N-ethylamine | Allyl isocyanate | Methyl 1-(N-methyl-N-ethylcarbamoyl)-N-(allylcarbamoyloxy)thioformimidate. |
| Ethyl mercaptan | Piperidine | do | Ethyl 1-(piperidinocarbonyl)-N-(allylcarbamoyloxy)thioformimidate |
| Do | do | Butyl isocyanate | Ethyl 1-(piperidinocarbonyl)-N-(butylcarbamoyloxy)thioformimidate. |
| Butyl mercaptan | do | Methyl isocyanate | Butyl 1-(piperidinocarbonyl)-N-(methylcarbamoyloxy)thioformimidate. |
| Do | do | Butyl isocyanate | Butyl 1-(piperidinocarbonyl)-N-(butylcarbamoyloxy)thioformimidate. |
| Methyl mercaptan | N-methyl-N-butylamine | Methyl isocyanate | Methyl 1-(N-methyl-N-butylcarbamoyl)-N-(methylcarbamoyloxy)-thioformimidate. |
| Ethyl mercaptan | Ammonia | do | Ethyl 1-carbamoyl-N-(methylcarbamoyloxy)thioformimidate. |
| Allyl mercaptan | do | do | Allyl 1-carbamoyl-N-(methylcarbamoyloxy)thioformimidate. |
| But-2-enyl mercaptan | do | Ethyl isocyanate | But-2-enyl 1-carbamoyl-N-(ethylcarbamoyloxy)thioformimidate. |
| Isopropyl mercaptan | do | Allyl isocyanate | Isopropyl 1-carbamoyl-N-(allylcarbamoyloxy)thioformimidate. |
| Methyl mercaptan | do | Propargyl isocyanate | Methyl 1-carbamoyl-N-(propargylcarbamoyloxy)thioformimidate. |
| Propyl mercaptan | do | Methyl isocyanate | Propyl 1-carbamoyl-N-(methylcarbamoyloxy)thioformimidate. |
| Allyl mercaptan | do | Allyl isocyanate | Allyl 1-carbamoyl-N-(allylcarbamoyloxy)thioformimidate. |
| Isopropyl mercaptan | do | Methyl isocyanate | Isopropyl 1-carbamoyl-N-(methylcarbamoyloxy)thioformimidate. |
| Butyl mercaptan | do | do | Butyl 1-carbamoyl-N-(methylcarbamoyloxy)thioformimidate. |
| sec-Butyl mercaptan | do | do | sec-Butyl 1-carbamoyl-N-(methylcarbamoyloxy)thioformimidate. |
| tert-Butyl mercaptan | do | do | tert-Butyl 1-carbamoyl-N-(methylcarbamoyloxy)thioformimidate. |
| Methyl mercaptan | do | Ethyl isocyanate | Methyl 1-carbamoyl-N-(ethylcarbamoyloxy)thioformimidate. |
| Butyl mercaptan | do | do | Butyl 1-carbamoyl-N-(ethylcarbamoyloxy)thioformimidate. |
| Methyl mercaptan | do | Isopropyl isocyanate | Methyl 1-carbamoyl-N-(isopropylcarbamoyloxy)thioformimidate. |
| Butyl mercaptan | do | do | Butyl 1-carbamoyl-N-(isopropylcarbamoyloxy)thioformimidate. |
| Allyl mercaptan | do | do | Allyl 1-carbamoyl-N-(isopropylcarbamoyloxy)thioformimidate. |
| Do | do | n-Propyl isocyanate | Allyl 1-carbamoyl-N-(n-propylcarbamoyloxy)thioformimidate. |
| Methyl mercaptan | do | Allyl isocyanate | Methyl 1-carbamoyl-N-(allylcarbamoyloxy)thioformimidate. |
| Butyl mercaptan | do | Allyl isocyanate | Butyl 1-carbamoyl-N-(allylcarbamoyloxy)thioformimidate. |
| Allyl mercaptan | do | Propargyl isocyanate | Allyl 1-carbamoyl-N-(propargylcarbamoyloxy)thioformimidate. |

EXAMPLE II

To a stirred suspension of 48 parts of 50% sodium hydride and mineral oil in 648 parts of tetrahydrofuran is added portion-wise over a one-hour period 114 parts of methyl 1-(carbamoyl)-N-hydroxythioformimidate. The temperature is maintained at 20 to 30° C. After subsidence of hydrogen evolution, 107.5 parts of dimethylcarbamoyl chloride is added dropwise at 15–25° C. Stirring is continued for one hour after the completion of addition. The inorganic solids are then removed by filtration and the methyl 1-carbamoyl - N - (dimethylcarbamoyloxy)thioformimidate is recovered by removal of the solvent under reduced pressure.

The compounds of Table II are prepared according to the procedures of Example II, using the N-hydroxythioformimidates and carbamoyl chlorides listed in place of methyl 1-(carbamoyl)-N-hydroxythioformimidate and dimethylcarbamoyl chloride.

I claim:

1. A process for preparing alkyl 1-(carbamoyl)-N-(carbamoyloxy)thioformimidates of the formula (1) 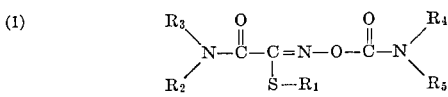

wherein $R_1$ is alkyl of 1 through 4 carbon atoms or alkenyl of 3 through 4 carbon atoms;

$R_2$ is hydrogen, alkyl of 1 through 4 carbon atoms, methoxy or cycloalkyl of 3 through 5 carbon atoms;

$R_3$ is hydrogen or alkyl of 1 through 4 carbon atoms; with the proviso that $R_2$ and $R_3$ can be taken together and are alkylene of 2 through 6 carbon atoms, and with the limitation that $R_2$ and $R_3$ never total more than 7 carbon atoms;

TABLE II

| N-hydroxythioformimidate | Carbamoyl chloride | Product |
|---|---|---|
| Methyl 1-carbamoyl-N-hydroxythioformimidate | N-allyl-N-methylcarbamoyl chloride | Methyl 1-carbamoyl-N-(N-allyl-N-methylcarbamoyloxy)thioformimidate. |
| Do | N-methyl-N-propargylcarbamoyl chloride | Methyl 1-carbamoyl-N-(N-methyl-N-propargylcarbamoyloxy)thioformimidate. |
| Do | N-methyl-N-propylcarbamoyl chloride | Methyl 1-carbamoyl-N-(N-methyl-N-propylcarbamoyloxy)thioformimidate. |
| Do | N-ethyl-N-methylcarbamoyl chloride | Methyl 1-carbamoyl-N-(N-ethyl-N-methylcarbamoyloxy)thioformimidate. |
| Methyl 1-methylcarbamoyl-N-hydroxythioformimidate | Dimethylcarbamoyl chloride | Methyl 1-(methylcarbamoyl)-N-(dimethylcarbamoyloxy)thioformimidate. |
| Methyl 1-dimethylcarbamoyl-N-hydroxythioformimidate | do | Methyl 1-(dimethylcarbamoyl)-N-(dimethylcarbamoyloxy)thioformimidate. |
| Methyl 1-cyclopentylcarbamoyl-N-hydroxythioformimidate | do | Methyl 1-(cyclopentylcarbamoyl)-N-(dimethylcarbamoyloxy)thioformimidate. |
| Propyl 1-carbamoyl-N-hydroxythioformimidate | do | Propyl 1-carbamoyl-N-(dimethylcarbamoyloxy)thioformimidate. |
| Ethyl 1-carbamoyl-N-hydroxythioformimidate | do | Ethyl 1-carbamoyl-N-(dimethylcarbamoyloxy)thioformimidate. |
| Butyl 1-carbamoyl-N-hydroxythioformimidate | do | Butyl 1-carbamoyl-N-(dimethylcarbamoyloxy)thioformimidate. |

$R_4$ is alkyl of 1 through 3 carbon atoms, allyl or propargyl; and $R_5$ is hydrogen or methyl;

by the steps comprising:
  (a) reacting diketene with ammonia or an amine in the presence of water, or an organic solvent at a temperature of from about −20° C. to 80° C.;
  (b) chlorinating the product of step (a) at a temperature between about −10° C. and 70° C. in the presence or absence of water, methanol, ethanol, isopropanol or their mixtures;
  (c) reacting the product of step (b) with a nitrosating agent, in the presence of methanol, ethanol, isopropanol, water, or their mixtures, at a temperature between about −20° C. and 50° C. and a pH above 4.0;
  (d) reacting the product of step (c) with an alkyl mercaptan of the formula $R_1SH$, wherein $R_1$ is as defined above; and then raising the pH to the range of 5–9 by the addition of a hydroxide, carbonate or bicarbonate of sodium, potassium, calcium or magnesium;
  (e) reacting the product of step (d) with
    (1) an appropriate carbamoyl chloride in the presence of a base; or
    (2) an appropriate isocyanate in the presence or absence of a basic catalyst;
  in water, acetone, methylene chloride, methyl ethyl ketone or methyl isobutyl ketone.

2. The process of claim 1 wherein step (a) is carried out in water.

3. The process of claim 1 wherein step (a) is carried out at a temperature between about 0° C. and 50° C.

4. The process of claim 1 wherein step (b) is carried out at a temperature between about 20° C. and 50° C.

5. The process of claim 1 wherein step (b) is carried out in water.

6. The process of claim 1 wherein the product of step (b) is isolated and step (c) is carried out in ethanol.

7. The process of claim 1 wherein step (c) is carried out in water using sodium nitrite and hydrochloric acid as the source of nitrous acid.

8. The process of claim 1 wherein step (c) is carried out at a pH above 4.5, and a temperature between about 0° C. and 10° C.

9. The process of claim 1 wherein step (e) is carried out using an isocyanate and trimethylamine or triethylenediamine as the basic catalyst.

10. The process of claim 1 wherein step (e) is carried out using a carbamoyl chloride and triethylamine, trimethylamine, or a hydroxide, carbonate or bicarbonate of sodium, potassium, calcium or magnesium as the base.

11. The process of claim 1 wherein step (e) is carried out in acetone, methylene chloride, methyl ethyl ketone, or methyl isobutyl ketone.

12. A process for preparing alkyl 1-(carbamoyl)-N-(carbamoyloxy)thioformimidates of the formula (1) 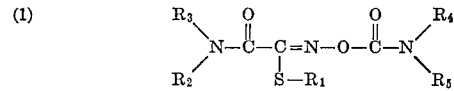

wherein
$R_1$ is alkyl of 1 through 4 carbon atoms or alkenyl of 3 through 4 carbon atoms;

$R_2$ is hydrogen, alkyl of 1 through 4 carbon atoms, methoxy or cycloalkyl of 3 through 5 carbon atoms;

$R_3$ is hydrogen or alkyl of 1 through 4 carbon atoms; with the proviso that $R_2$ and $R_3$ can be taken together and are alkylene of 2 through 6 carbon atoms, and with the limitation that $R_2$ and $R_3$ never total more than 7 carbon atoms;

$R_4$ is alkyl of 1 through 3 carbon atoms, allyl or propargyl; and $R_5$ is hydrogen or methyl;

by the steps comprising:
  (1) chlorinating an appropriate acetoacetamide at a temperature between about −10° C. and 70° C. in the presence or absence of water, methanol, ethanol, isopropanol or their mixtures;
  (2) reacting the product of step (1) with a nitrosating agent at a temperature between about −20 and 50° C. in the presence of methanol, ethanol, isopropanol, water, or their mixtures;
  (3) reacting the product of step (2) with an alkyl mercaptan of the formula $R_1SH$, wherein $R_1$ is as defined above; and then raising the pH to the range of 5–9 by the addition of a hydroxide, carbonate or bicarbonate of sodium, potassium, calcium or magnesium;
  (4) reacting the product of step (3) with
    (1) an appropriate carbamoyl chloride in the presence of a base; or
    (2) an appropriate isocyanate in the presence or absence of a basic catalyst;
  in water, acetone, methylene chloride, methyl ethyl ketone or methyl isobutyl ketone.

13. The process of claim 12 wherein step (1) is carried out in water.

14. The process of claim 12 wherein step (1) is carried out at a temperature between about 20° C. and 50° C.

15. The process of claim 12 wherein step (2) is carried out in water using sodium nitrite and hydrochloric acid as the source of nitrous acid.

16. The process of claim 12 wherein step (4) is carried out in acetone, methylene chloride, methyl ethyl ketone, or methyl isobutyl ketone.

References Cited

UNITED STATES PATENTS 2,174,239  9/1939  Gleason _____ 260—561

FOREIGN PATENTS 1,157,026  7/1969  Great Britain _____ 260—561

OTHER REFERENCES

Chem. Abstracts, vol. 69, 1968, 35430s.

Chemische Berichte, 88, Nov. 1, 1955, pp. 130–133.

LEWIS GOTTS, Primary Examiner

E. G. LOVE, Assistant Examiner

U.S. Cl. X.R.

260—293.4, 294.7, 326.3, 326.5, 453, 561, 566; 424—244, 274, 327, 267